J. S. COOPER.
RESILIENT WHEEL.
APPLICATION FILED FEB. 24, 1916.

1,197,798.

Patented Sept. 12, 1916.

WITNESSES:
L. J. Forde
B. M. Doolin

INVENTOR
Joel S. Cooper
BY Strong & Townsend
ATTORNEYS

UNITED STATES PATENT OFFICE.

JOEL S. COOPER, OF SANTA BARBARA, CALIFORNIA.

RESILIENT WHEEL.

1,197,798.     Specification of Letters Patent.     Patented Sept. 12, 1916.

Application filed February 24, 1916. Serial No. 80,210.

*To all whom it may concern:*

Be it known that I, JOEL S. COOPER, a citizen of the United States, residing at Santa Barbara, in the county of Santa Barbara and State of California, have invented new and useful Improvements in Resilient Wheels, of which the following is a specification.

My invention relates to resilient wheels such as may be applied to automobiles and other vehicles.

It consists of an outer and an inner rim disposed concentrically with the felly of the wheel, the outer rim having flanges slidably fitting over similar flanges on the inner rim and having an intermediate ring, and springs passing through said intermediate ring and connecting the outer and inner rims so as to provide a tension.

It also comprises details of construction which will be more fully explained by reference to the accompanying drawings, in which—

Figure 1:
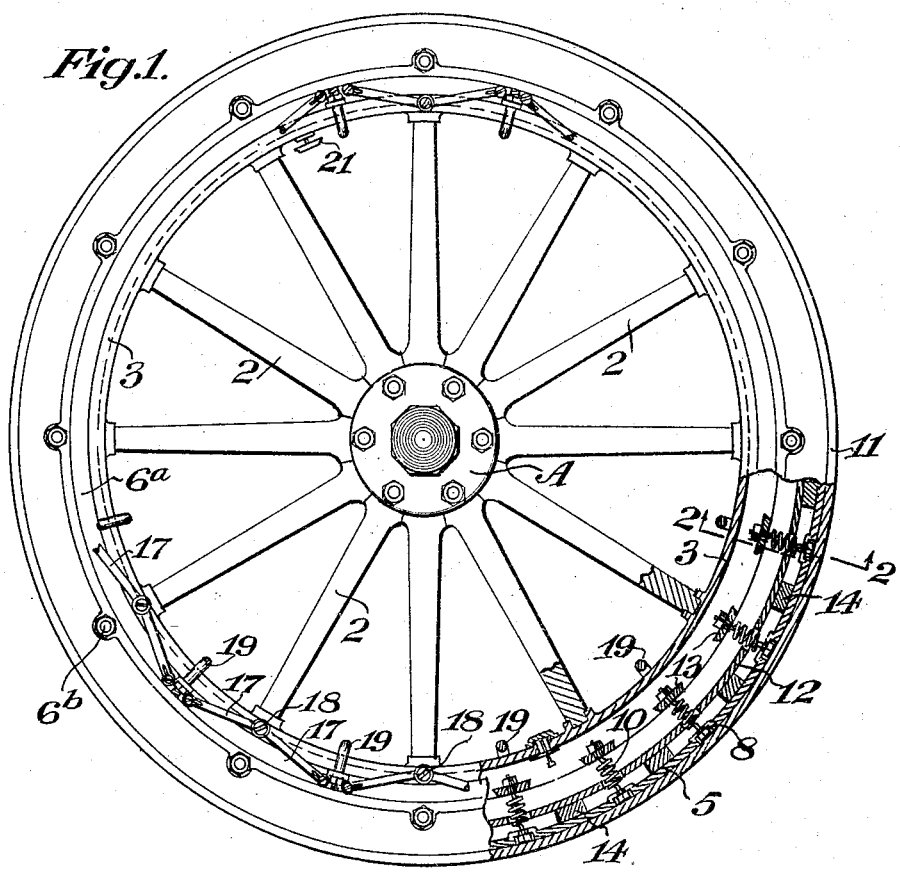
Figure 2:
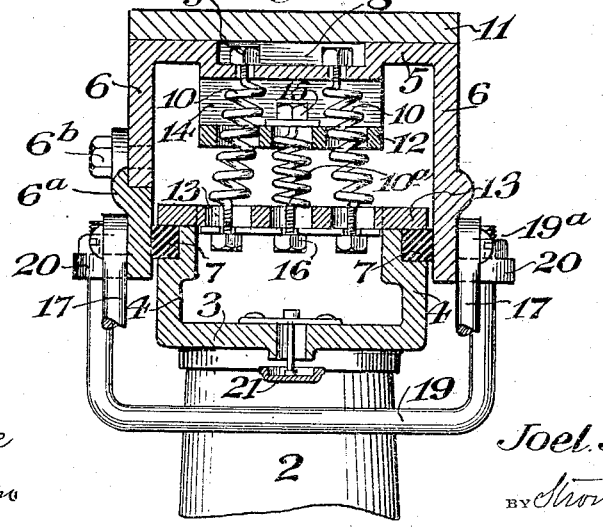

Figure 1 is a side view and partial section of the wheel. Fig. 2 is a section taken on the line 2—2 of Fig. 1.

As shown in the drawings, A represents the hub of a wheel, having spokes 2, the outer ends of which are fixed in an inner rim 3 having outwardly projecting flanges 4 standing at right angles to the part 3.

5 is the outer rim which also has inwardly turned flanges at right angles to the part 5, and these are separated sufficiently to inclose the flanges 4 of the inner rim.

Annular elastic cushions 7 are set in grooves around the sides of the flanges 4, and these cushions make a tight fit between the flanges 4 and 6, so that movement between the two, caused by the weight of the wheel, may take place without admitting any dust or dirt to the interior. The outer face of the rim 5 has depressions 8 adapted to receive the heads of nuts 9, with which the outer ends of springs 10 are connected, and exteriorly to this rim 5 and the depressions 8 is the outer tread 11.

The springs 10 pass through openings in an intermediate ring 12 being guided thereby, and their inner ends are secured to bars 13 which extend transversely across the flanges of the inner rim and may be dovetailed in place, as shown. Between the outer rim and the ring 12 are fixed at intervals blocks 14, upon which the ring 12 rests at points between the springs 10. The blocks 14 preferably have a tight fit between ring 12 and tread 11 so as to prevent ring 12 from moving radially, the springs 10 preventing lateral movement of the ring. This construction retains this intermediate ring in its position concentric with the outer rim 5. All of the springs 10 pass freely through the ring 12 and any compression caused by the changes of weight on the interior portion of the wheel will be compensated by these springs.

Fig. 2 is a view across the upper portion of the wheel, so that the springs 10 are practically suspending springs; the number at the upper part of the wheel and the tension of the springs being such that the weight on the inner portion of the wheel will be nearly or quite all suspended from the upper part of the wheel while rotating.

Intermediate between the springs 10 is another series of springs $10^a$, and these springs extend only from the bars 13, through which the threaded portion of the springs pass, to the ring 12 where they are secured by nuts 15; the heads 16 at the opposite end being held where they pass through the bars 13.

In order to hold these independent rings and parts and prevent them from shifting circumferentially under the strain of traction, I have shown braces 17, the outer ends of which are slidably connected to the flanges 6 of the outer rim and the inner ends are secured by bolts 18 to the flanges 4 of the inner rim 3. Yokes 19 pass around the inner rim and the outer ends are secured and adjusted by nuts $19^a$ engaging outwardly turned lugs 20 which project from the flanges 6 of the outer rim. These yokes and connections provide means to regulate the spring tension. The diagonal position of the braces 17 is such that the radial motion of the inner rim, with reference to the outer rim, will be allowed for, permitting the two parts to move with relation to each other.

$6^a$ is a ring secured by bolts $6^b$ to the flange 6 of the outer rim and overlapping the inner rim. When this ring is removed, it allows the wheel mechanism to be dismounted.

In order to insure the discharge of any water or moisture which may have obtained access to the space between the rims, I have shown a valve 21, the stem of which passes through a hole in the inner rim 3, and the valve is so fixed that it will open when in a certain position.

Having thus described my invention, what I claim and desire to secure by Letters Patent is—

1. In a wheel, an inner rim having a peripheral channel, spaced perforated bars extending transversely across the rim, an outer rim having its periphery formed with spaced depressions the bottoms of which are perforated and located opposite to the respective bars, a ring secured in spaced relation to the outer rim and having perforations in register with those of the bars and depression bottoms, two outer series of coil springs passing through the registering perforations of the bars, ring and depression bottoms and having nuts thereon disposed in the inner rim channel and the depressions, and a central series of coil springs between the outer series extending through other perforations of the bars and ring, and having nuts thereon disposed in the inner rim channel and the space between the ring and outer rim.

2. In a wheel, an inner rim, an outer rim, a perforated ring between the inner and outer rim spaced from each, a pair of outer series of coil springs secured to the inner and outer rims and passing freely through the ring perforations, and a central series of coil springs between the two outer series connected to the inner rim and ring.

In testimony whereof I have hereunto set my hand in the presence of two subscribing witnesses.

JOEL S. COOPER.

Witnesses:
JOHN H. HERRING,
W. W. HEALEY.

Copies of this patent may be obtained for five cents each, by addressing the "Commissioner of Patents, Washington, D. C."